United States Patent [19]
Huth et al.

[11] 3,860,734
[45] Jan. 14, 1975

[54] ESSENCES OF FRESH POT-HERBS AND PROCESS FOR PREPARING SAME

[75] Inventors: Heinz Huth; Klaus Werner, both of Holzminden, Germany

[73] Assignee: Dragoco Gerberding & Co. GmbH, Holzminden, Germany

[22] Filed: Feb. 1, 1973

[21] Appl. No.: 328,549

[30] Foreign Application Priority Data
Feb. 24, 1972 Germany............................ 2208815

[52] U.S. Cl.................. 426/369, 426/373, 426/377, 426/425, 426/429
[51] Int. Cl.............................................. A23l 1/22
[58] Field of Search ........... 426/369, 175, 205, 221, 426/229, 377, 386, 425, 429, 524

[56] References Cited
UNITED STATES PATENTS
3,258,343   6/1966   Noznick et al...................... 426/369

3,645,756   2/1972   Huth.................................. 426/429

FOREIGN PATENTS OR APPLICATIONS
1,053,911   3/1959   Germany

Primary Examiner—Raymond N. Jones
Assistant Examiner—Esther L. Massung
Attorney, Agent, or Firm—Browdy and Neimark

[57] ABSTRACT

Essences of fresh pot-herbs are produced by comminuting pot-herbs in the frozen state and pressing the comminuted mass to express liquid therefrom. The pressed mass is treated with concentrated acetic acid and an acetic acid extract is expressed from the treated mass. The expressed liquid and acetic acid extract are then combined forming the herb essence.

7 Claims, No Drawings

ESSENCES OF FRESH POT-HERBS AND PROCESS FOR PREPARING SAME

This invention relates to a method of producing lasting essences of fresh pot-herbs, which essences possess the odor and taste of the fresh herbs in an outstanding manner, and can, therefore, be used instead of fresh herbs as condiments or flavorings for foodstuffs.

It is known that aromatic substances can be obtained from fresh pot-herbs by distilling off the volatile substances from the herbs by means of steam. These volatile substances are known as essential oils. For practical use these concentrated aromatic substances are diluted with solvents or carriers, as for example, ethyl alcohol, acetic acid, common salt, and edible oils. These essences are frequently used instead of fresh herbs for flavoring foodstuffs. In respect of their effect on flavor, these preparations of essential oils are however inferior to the action of the fresh plants or parts of the plants. Essential oils lack the impressive odor and taste of freshness of fresh pot-herbs. This can be explained by the fact that in the distillation process, only the volatile aromatic substances are obtained, but not the non-volatile substances which also make a contribution to the full taste. The nature of the technique employed in the distillation process also has a detrimental effect on some of the aromatic substances.

There has consequently been no lack of attempts to overcome the disadvantage mentioned by producing extracts from fresh or carefully dried pot-herbs. In processes known up to the present time however, too little attention has been paid to the fact that considerable variations of the aromatic substances occur within a short time, as the result of enzyme actions, even during the comminution of the plants.

The usual drying methods destroy the freshness character of pot-herbs to a greater or lesser extent. None of the methods known in the prior art permits the production of essences which impart to foods the impression of odor and taste of fresh pot-herbs and which at the same time are sterile and stable during storage.

According to the present invention there is provided a method of producing substantially sterile, lasting essences of fresh pot-herbs, comprising: comminuting frozen pot-herbs; pressing the comminuted herbs at a temperature no greater than a few degrees above the freezing point of water to express liquid therefrom and to form a press cake; treating the press cake with concentrated acetic acid; pressing the treated cake to express acetic acid extract therefrom; and combining the expressed liquid and acetic acid extract.

Preferably the comminuted herbs are pressed at from 0° to 10°C.

The process described below by way of example permits the production of liquid and pulverulent essences which to a large extent correspond in respect of their odor and taste to those of the fresh pot-herbs, and which essences are sterile and stable during storage. In the process of the present invention it is of fundamental importance that in order to avoid intensive enzyme activities the fresh pot-herbs should be comminuted in the frozen state and pressed at temperatures of only a few degrees above the freezing point of water, preferably at +5°C. In order to obtain the aromatic substances which remain in the solid residue from the pressing operation, and which are equally important, concentrated acetic acid has been found to be an excellent solvent.

Moreover, it has surprisingly been found that a residual content of acetic acid, which remains after the drying process in the dry essences obtained from these extracts, has a stabilizing action on the essence.

More specifically the procedure conveniently comprises comminuting the pot-herbs in the frozen state to form a paste, the latter being thereupon pressed at a temperature of about +5°C in a suitable press to form a press cake. The press cake is divided into a number of parts and these are treated one after the other with concentrated acetic acid, one part being thoroughly mixed with 99/100 percent concentrated acetic acid, whereupon the mixture is pressed and the expressed liquid containing acetic acid is applied to another part of the untreated press cake, and so on in succession.

Depending on the type of pot-herb, this process may be repeated about 3 to 4 times until the concentration of acetic acid in the expressed liquid has fallen to about 40 percent. At this concentration the power of the acetic acid to dissolve the aromatic substances plainly declines.

The expressed liquid containing acetic acid is then combined with the first expressed liquid, about 10 to 18 percent by weight common salt may be added for preservation purposes, the mixture is centrifuged in order to clarify it, and is then filtered through a sterile filter.

In order to obtain dry essences, the combined expressed liquids, together with hydrocolloids, as for example, starch, starch syrup, gum arabic, and an edible oil which is very stable during storage, for example the product "Myritol" of Henkel, Dusseldorf, are converted in known manner into an emulsion and dried.

All products have very good stability in storage, even at room temperature.

Some preferred embodiments of the process of the present invention will now be described by way of example.

EXAMPLE 1

300 kg of deep-frozen dill (a well-known pot-herb) are comminuted in the frozen state in a mincer to form a paste, thawed to +5°C, and then pressed in a high pressure press. There are obtained:

222 kg expressed liquid (I) and 78 kg press cake. The expressed liquid is kept at about +5°C until required for further processing. The press cake is divided into three equal parts, each of 26 kg. 26 kg acetic acid (99/100 percent) are poured over the first 26 kg portion of crumbled press cake, and after one hour the mixture is pressed. Yield: about 26 kg expressed liquid. The press cake is discarded. The expressed liquid is then processed for a second and a third time in the manner described with the second and third 26 kg portion of press cake.

The expressed liquid (I) and the acetic acid solution are then combined. 248 kg of dill essence (II) are obtained. 37 kg of common salt are then added to the essence, whereupon the solution is passed through a clarifying separator and then subjected to sterile filtering in the cold state. A product forming a clear solution in water is obtained. A 0.3 percent solution in a 0.5 percent common salt solution has an excellent odor and taste of fresh dill.

EXAMPLE 2

84.8 kg of the dill essence (II) obtained in Example 1 are subjected to sterile filtration, emulsified with 15 kg starch syrup powder and 0.2 kg "Myritol" special oil in a colloid mill, and then spray-dried. 17.5 kg of a powder having a very aromatic odor of fresh dill are obtained. A 0.1 percent solution in 0.5 percent salt water has a good taste of fresh dill.

Tarragon, basil, celery, lovage, parsley, peppermint and chives essences can, for example, be obtained in the same way.

What is claimed is:

1. A method of producing substantially sterile, lasting essences of fresh pot-herbs comprising comminuting frozen pot-herbs, pressing the comminuted herbs at a temperature no greater than a few degrees above the freezing point of water to express liquid therefrom and to form a press cake, treating the press cake with concentrated acetic acid, pressing the treated cake to express acetic acid extract therefrom, and combining the expressed liquid and acetic acid extract.

2. A method according to claim 1, wherein the comminuted herbs are pressed at a temperature of from 0° to 10°C.

3. A method according to claim 1 wherein the press cake is divided into a number of portions and the individual portions are treated in succession with the acetic acid solution and pressed.

4. A method according to claim 1 wherein the combined liquids are mixed with 10 to 18 percent of common salt and filtered through a sterile filter.

5. A method according to claim 4, wherein the combined liquids are emulsified together with hydrocolloids and a durable edible oil, and are then dried.

6. A method according to claim 5, wherein the comminuted herbs are pressed at a temperature of about 5°C.

7. A method according to claim 1, wherein said pot-herbs are selected from the group consisting of dill, tarragon, basil, celery, lovage, parsley, peppermint and chives.

* * * * *